United States Patent
Lee et al.

(10) Patent No.: US 6,834,190 B1
(45) Date of Patent: Dec. 21, 2004

(54) CONTROLLING METHOD AND APPARATUS FOR TRANSITION BETWEEN MODES AT TRAFFIC CHANNEL SUBSTRATE IN MOBILE COMMUNICATION SYSTEM

(75) Inventors: Hyun-Seok Lee, Songnam-shi (KR); Chang Yong, Songnam-shi (KR)

(73) Assignee: Samsung Electronics Co., Ltd (KR)

( * ) Notice: Subject to any disclaimer, the term of this patent is extended or adjusted under 35 U.S.C. 154(b) by 600 days.

(21) Appl. No.: 09/602,216

(22) Filed: Jun. 23, 2000

Related U.S. Application Data

(60) Provisional application No. 60/140,601, filed on Jun. 23, 1999.

(51) Int. Cl.$^7$ .............................. H04Q 7/20; H04Q 7/00
(52) U.S. Cl. .................... 455/436; 455/432.2; 455/438; 455/439; 455/442; 455/450; 370/329; 370/331; 370/460
(58) Field of Search .............................. 455/436, 432.2, 455/438, 439, 442, 450; 370/329, 331, 468

(56) References Cited

U.S. PATENT DOCUMENTS

| | | | |
|---|---|---|---|
| 6,473,419 B1 | * 10/2002 | Gray et al. | 370/349 |
| 6,480,481 B1 | * 11/2002 | Park et al. | 370/242 |
| 6,631,126 B1 | * 10/2003 | Berliner et al. | 370/342 |

\* cited by examiner

*Primary Examiner*—Vivian Chin
*Assistant Examiner*—Eugene Yun
(74) *Attorney, Agent, or Firm*—Dilworth & Barrese, LLP

(57) ABSTRACT

An apparatus and method for controlling mode transition in a traffic channel substate in a mobile communication system. If a control hold mode should be transited to an active mode a BSC sets a transmission rate on a DCCH in use to a continuous rate and transmits the continuous rate information to a BTS that an MS is within the coverage area of the BTS. Then, the BSC allocates an additional required channel besides the DCCH. If an active mode should be transited to a control hold mode, a BSC sets a transmission rate on a DCCH in use to a predetermined gating rate and transmits the gating rate information to a BTS that an MS is within the coverage area of the BTS. Then, the BSC releases an additional required channel besides the DCCH.

14 Claims, 14 Drawing Sheets

FIG. 10

| INFORMATION ELEMENT | ELEMENT DIRECTION | TYPE | |
|---|---|---|---|
| MESSAGE TYPE II | SOURCE BS > TARGET BS | | M |
| CALL CONNECTION REFERENCE | SOURCE BS > TARGET BS | O | R |
| CORRELATION ID | SOURCE BS > TARGET BS | O | C |
| A3 SIGNALING ADDRESS | SOURCE BS > TARGET BS | O | C |
| SDU-ID | SOURCE BS > TARGET BS | O | C |
| MOBILE IDENTITY(IMSI/MIN) | SOURCE BS > TARGET BS | O | R |
| MOBILE IDENTITY(ESN) | SOURCE BS > TARGET BS | O | R |
| EXTENDED SERVICE CONFIGURATION RECORD | SOURCE BS > TARGET BS | O | R |
| PHYSICAL RESOURCE CONTROL INFORMATION | SOURCE BS > TARGET BS | O | R |
| FRAME SELECTOR INFO | SOURCE BS > TARGET BS | O | R |
| CONTROL ACTION TIME | SOURCE BS > TARGET BS | O | R |

M : MANDATORY, O : OPTIONAL, C : CONDITIONALLY REQUIRED, R : REQUIRED

FIG. 11

| INFORMATION ELEMENT | ELEMENT DIRECTION | TYPE | |
|---|---|---|---|
| MESSAGE TYPE II | TARGET BS > SOURCE BS | M | |
| CALL CONNECTION REFERENCE | TARGET BS > SOURCE BS | O | R |
| CORRELEATION ID | TARGET BS > SOURCE BS | O | C |
| PHYSICAL RESOURCE CONTROL RESULTS | TARGET BS > SOURCE BS | O | R |
| CONTROL ACTION TIME | TARGET BS > SOURCE BS | O | R |
| ALLOCATED CHANNEL INFORMATION | TARGET BS > SOURCE BS | O | C |

M : MANDATORY, O : OPTIONAL, C : CONDITIONALLY REQUIRED, R : REQUIRED

FIG. 12

| TIMER NAME | DEFAULT VALUE | RANGE OF VALUES | GRANULARITY |
|---|---|---|---|
| Tstatectrl | 0.6 sec | 0.0–1.0 sec | 0.1 sec |

FIG. 13

| INFORMATION ELEMENT | ELEMENT DIRECTION | TYPE |
|---|---|---|
| MESSAGE TYPE II | SOURCE BS > TARGET BS | M |
| CALL CONNECTION REFERENCE | SOURCE BS > TARGET BS | R |
| CDMA LONG CODE TRANSITION INFO | SOURCE BS > TARGET BS | C |
| CHANNEL ELEMENT ID | SOURCE BS > TARGET BS | C |
| A3 TRAFFIC CIRCUIT ID | SOURCE BS > TARGET BS | C |
| REVERSE PILOT GATING RATE | SOURCE BS > TARGET BS | C |
| IS-2000 FORWARD POWER CONTROL MODE | SOURCE BS > TARGET BS | C |
| ID-2000 MOBILE PILOT GAIN | SOURCE BS > TARGET BS | C |
| A3 FROM ID | SOURCE BS > TARGET BS | C |
| A3 TO ID | SOURCE BS > TARGET BS | C |

M : MANDATORY, O : OPTIONAL, C : CONDITIONALLY REQUIRED, R : REQUIRED

FIG. 14

| INFORMATION ELEMENT | ELEMENT DIRECTION | TYPE | |
|---|---|---|---|
| MESSAGE TYPE II | TARGET BS > TARGET BS | M | |
| CALL CONNECTION REFERENCE | TARGET BS > TARGET BS | O | R |
| CELL INFORMATION RECORD(COMMITTED) | TARGET BS > TARGET BS | O | C |
| SDU ID | TARGET BS > TARGET BS | O | C |
| PNC CAUSE | TARGET BS > TARGET BS | O | C |
| CALL INFORMATION RECORD(UNCOMMITTED) | TARGET BS > TARGET BS | O | C |
| A3 FROM ID | TARGET BS > TARGET BS | O | C |
| A3 TO ID | TARGET BS > TARGET BS | O | C |

M : MANDATORY, O : OPTIONAL, C : CONDITIONALLY REQUIRED, R : REQUIRED

CONTROLLING METHOD AND APPARATUS FOR TRANSITION BETWEEN MODES AT TRAFFIC CHANNEL SUBSTRATE IN MOBILE COMMUNICATION SYSTEM

This application claims the benefit of 60/140,601 filed Jun. 23, 1999.

BACKGROUND OF THE INVENTION

1. Field of the Invention

The present invention relates generally to state transition in a mobile communication system, and in particular, to a method of controlling the change of a radio physical channel caused by transition between an active mode and a control hold mode in a traffic channel substate of a mobile station or a base station in the base station.

2. Description of the Related Art

A conventional CDMA (Code Division Multiple Access) mobile communication system provides primarily voice service. From this CDMA mobile communication system, IMT (International Mobile Telecommunication)-2000 standards have been evolved. An IMT-2000 mobile communication system is capable of additionally providing a high quality voice service, a moving picture service, Internet browsing, and various other data communications.

The standard CDMA mobile communication system is comprised of a base station (BS) having a base station transceiver system (BTS) and a base station controller (BSC), a mobile switching center (MSC), and a mobile station (MS). Radio links between the MS and the BTS are a forward link on which data is directed from the BTS to the MS and a reverse link on which data is directed from the MS to the BTS.

All channels are grouped into physical channels and logical channels. A logical channel is established on a physical channel. It is possible to establish a plurality of logical channels on one physical channel. If the physical channel is released, the logical channels are also released. A physical channel is not necessarily established prior to establishment of a logical channel. When an intended physical channel is set up for another logical channel, all that should be done is to allocate a logical channel in question on the established physical channel.

The physical channels are divided into dedicated channels and common channels according to their natures. The dedicated channels are dedicated to communications between a BTS and an MS, including a fundamental channel (FCH), a dedicated control channel (DCCH), and a supplemental channel (SCH). The FCH is commonly used to transmit data according to the for TIA/EIA-95-B standard and transmits a voice signal, a data signal, and a signaling signal (or a control signal). The DCCH transmits a data signal and a signaling signal. The SCH transmits a large amount of data. All other physical channels except the dedicated channels are common channels. The common channels are shared commonly by a plurality of MSs to communicate with a BTS. A physical channel on a forward link is a paging channel and a physical channel on a reverse link is an access channel. These common channels are compatible with the IS-95-B standard.

Dedicated logical channels allocated on the physical channels are a dedicated signaling channel (DSCH) and a dedicated traffic channel (DTCH). The DSCH can be allocated on an FCH and a DCCH. On the DTCH can be allocated all of the FCH, DCCH, and SCH information. The DSCH is so called because it transmits a control signal between a BTS and an MS. The DTCH is used to transmit user data between the BTS and the MS. Common logical channels allocated on the common physical channels are a common signaling channel (CSCH) for transmitting a signaling signal and a common traffic channel (CTCH) for transmitting user data. The common logical channels are allocated on the paging channel for the forward link and on the access channel for the reverse link.

In the CDMA mobile communication system, packet data communication is characterized in that transmission of burst data alternates with long non-transmission periods. Connection of a channel only at a data transmission starting point has been suggested for a packet data communication service in the future mobile communication system. That is, in consideration of limited radio resources, base station capacity and power consumption of an MS, a BS should secure a channel for data communication with another MS by releasing the channel for a non-data transmission period and rapidly reconnecting the channel when data transmission resumes. In addition, the BS should provide the MS with a function of controlling channel allocation duration, channel allocation action time, and channel allocation end time.

FIG. 1 is a diagram of transition between an active mode and a control hold mode in a traffic channel substate where traffic channel frames are communicated between an MS and a BS.

Referring to FIG. 1, an ERM (Extended Release Message), an ERMM (Extended Release Mini Message), and a UHDM (Universal Handoff Direction Message) are used for transition from the active mode to the control hold mode. An RAM (Resource Allocation Message), an RAMM (Resource Allocation Mini Message), an ESCAM (Extended Supplemental Channel Allocation Message), a Forward/Reverse SCAM (Supplemental Channel Allocation Message), and a UHDM are used for transition from the control hold mode to the active mode. An SCH can be allocated between the MS and the BS and gated transmission is not implemented on a reverse pilot channel in the active mode. On the other hand, the SCH is not allocated between the MS and the BS and the reverse pilot channel is gated-transmitted in the control hold state.

FIG. 2 illustrates a reference model as provided by the 3G IOS (Interoperability Specifications) for a digital air interface between an MSC and a BS and between BSs in a general mobile communication system.

Referring to FIG. 2, an A1 interface and an A2/A5 (exclusive for circuit data) are defined for transmitting a signal and user information respectively between an MSC 20 and a BSC 32. An A3 interface is defined to connect a target BS 40 to a frame selection/distribution function unit (SDU) 34 of a source BS 30 for soft/softer handoff between the BSs 30 and 40. Through the A3 interface are transmitted signaling and user data between the target BS 40 and the SDU 34 of the source BS 30. An A7 interface is defined to transmit/receive signals between the target BS 40 and the source BS 30 for soft/softer handoff between the BSs 30 and 40. An A8/A9 interface is used for transmitting signaling and user data between the source BS 30 and a PCF (Packet Control Function) block 50. A10 and A11 interfaces are defined to transmit signaling and user data between the PCF 50 and a PDSN (Packet data Serving Node) 60.

Wired communications links between BSs and between a BS 30 and an MSC in the CDMA mobile communication system are forward link directed from the MSC to the BS, a reverse link directed from the BS to the MSC, and link connected between the BSs. Specific procedures are performed in BSs and MSCs when packet data is transmitted within a BS, between the BSs, and between the MSCs.

FIG. 3 illustrates function mapping for state transition between modes shown in FIG. 1.

In FIG. 3, the function mapping is shown for the case that MAC and L2/L3 are given to a source BSC 32, an MS 2 is within the coverage area of the target BTS 40 after soft handoff, and the MS 2 or the BSs are transited from an active mode to a control hold mode or vice versa. Here, the source BS 30 is responsible for controlling a radio channel in use for the MS 2. Therefore, a signal for controlling the radio channel is transmitted through an A7 or A3 signal message. For example, when the active mode is transited to the control hold mode, an SCH used for communication between the MS 2 and a channel element 46 of the target BTS 40 should be released and the source BSC 32 should inform the target BTS 40 of information about gated transmission of a reverse pilot channel. On the other hand, upon transition from the control hold mode to the active mode, gated transmission of the reverse pilot channel is discontinued and an SCH is allocated to the MS 2 when necessary.

IMT-2000 standards are under development. However, this standardization work does not include definition of either a signal message (on the A7 interface) for mode transition between a BSC and an MS that belongs to a BTS (or a target BTS after soft handoff) or its related procedure. That is, no due consideration has been given to control of a corresponding physical channel for the case that an L3 signal message is generated for mode transition in a source BTS or an MS. For example, when an L3 signal message is generated, set-up and release of an FCH, a DCCH, and an SCH and designation of a reverse pilot channel gating rate has not been considered. As a result, a call is dropped at mode transition.

SUMMARY OF THE INVENTION

It is, therefore, an object of the present invention to provide a method and apparatus for controlling a corresponding physical channel upon mode transition at a BSC or a BTS in a mobile communication system.

It is another object of the present invention to provide a method and apparatus for controlling mode transition between a source BTS and an MS within the coverage area of a target BTS in a mobile communication system.

It is a further object of the present invention to provide a method and apparatus for generating a signal message to control mode transition between a BSC and a BTS or between a source BSC and a target BTS and performing a related procedure in a mobile communication system.

It is still another object of the present invention to provide a method and apparatus for preventing call drop at mode transition in a mobile communication system.

The above objects can be achieved by providing an apparatus and method for controlling mode transition in a traffic channel substate in a mobile communication system. If a control hold mode should be transited to an active mode a BSC sets a transmission rate on a DCCH in use to a continuous rate and transmits the continuous rate information to a BTS that an MS is within the coverage area of the BTS. Then, the BSC allocates an additional required channel besides the DCCH. If an active mode should be transited to a control hold mode, a BSC sets a transmission rate on a DCCH in use to a predetermined gating rate and transmits the gating rate information to a BTS that an MS is within the coverage area of the BTS. Then, the BSC releases an additional required channel besides the DCCH.

BRIEF DESCRIPTION OF THE DRAWINGS

The above and other objects, features and advantages of the present invention will become more apparent from the following detailed description when taken in conjunction with the accompanying drawings in which:

FIG. 10 illustrates the format of an A7-State Control Request message for use in controlling mode transition according to the present invention;

FIG. 11 illustrates the format of an A7-State Control Response message for use in controlling mode transition according to the present invention;

FIG. 12 is a table listing values of a timer Tstatectrl for use in controlling mode transition according to the present invention, as described in FIGS. 6 and 7;

FIG. 13 illustrates the format of an A3-Physical Transition Directive message for controlling mode transition according to the present invention; and FIG. 14 illustrates the format of an A3-Physical Transition Directive Ack message for use in controlling mode transition according to the present invention.

DETAILED DESCRIPTION OF THE PREFERRED EMBODIMENT

A preferred embodiment of the present invention will be described hereinbelow with reference to the accompanying drawings. In the following description, well-known functions or constructions are not described in detail since they would obscure the invention in unnecessary detail.

Figure 1:
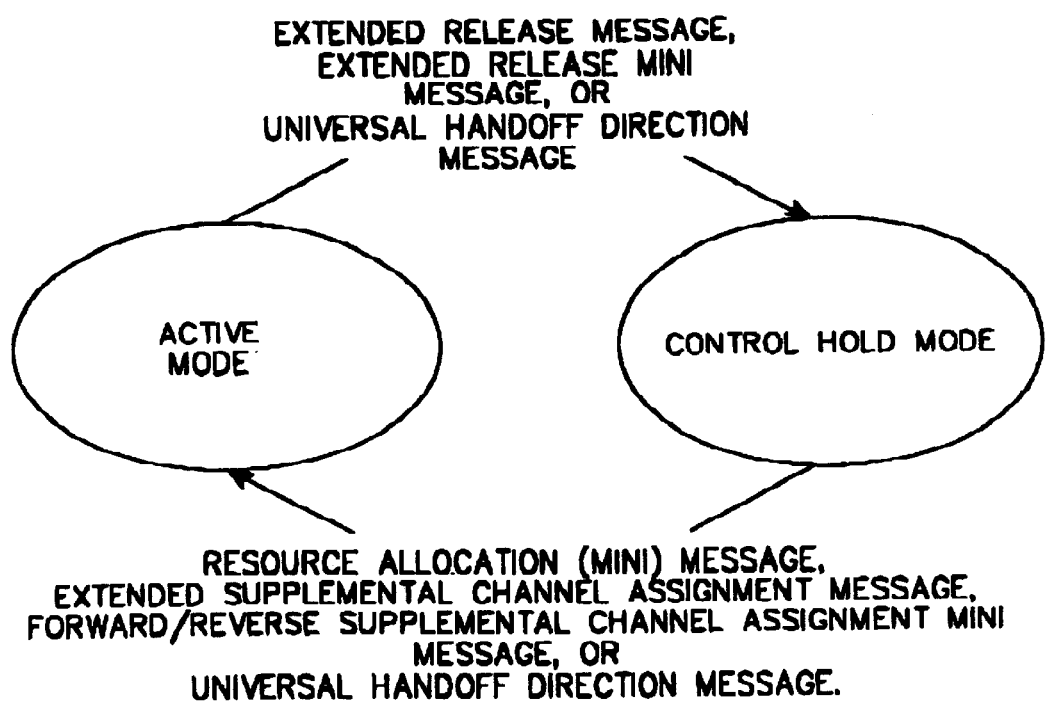
FIG. 1 is a diagram of transition between an active mode and a control hold mode at a traffic channel substate in a general mobile communication system.
Figure 2:
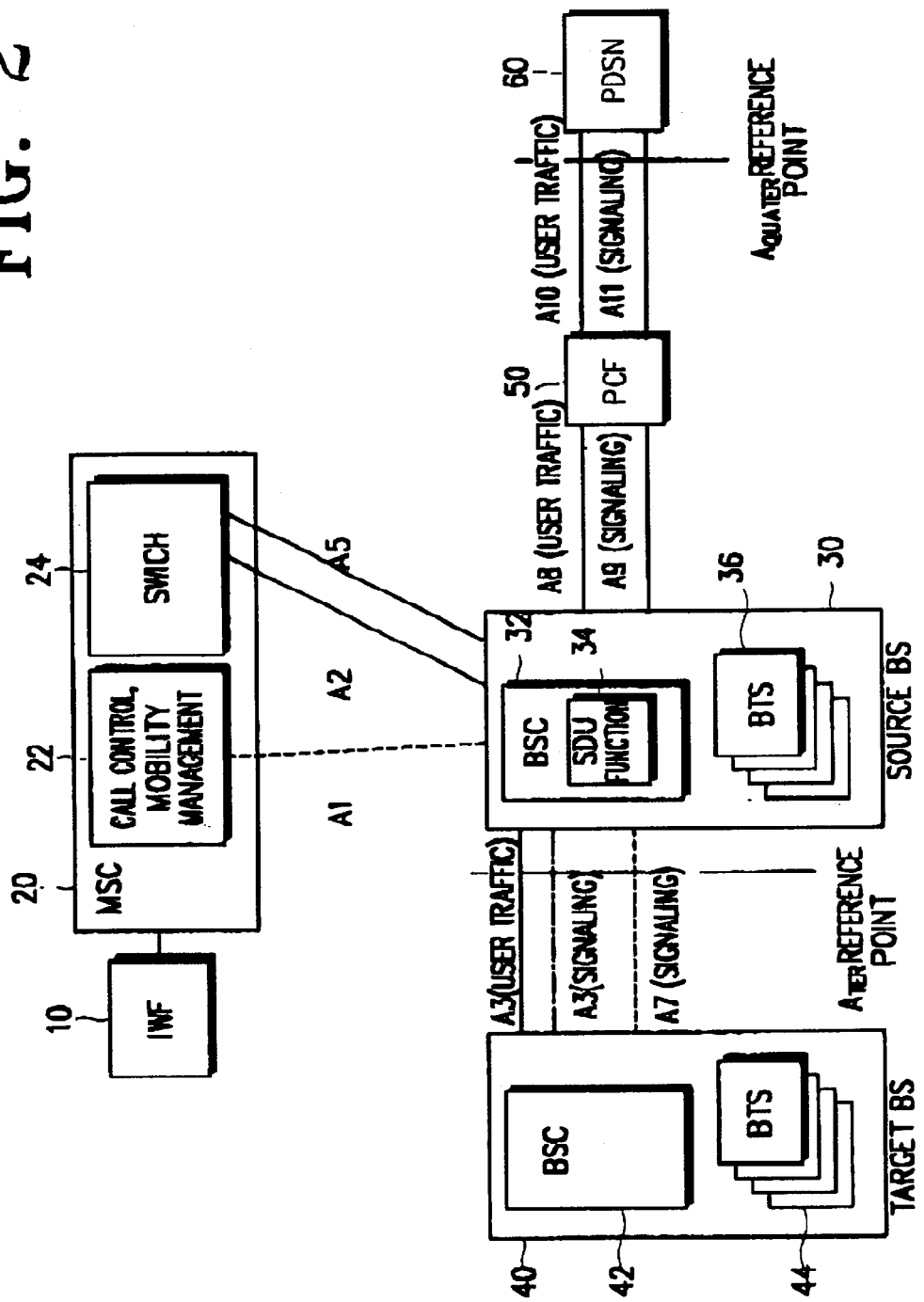
FIG. 2 illustrates a 3G IOS reference model for a digital air interface between an MSC and a BS and between BSs in the general mobile communication system.
Figure 3:
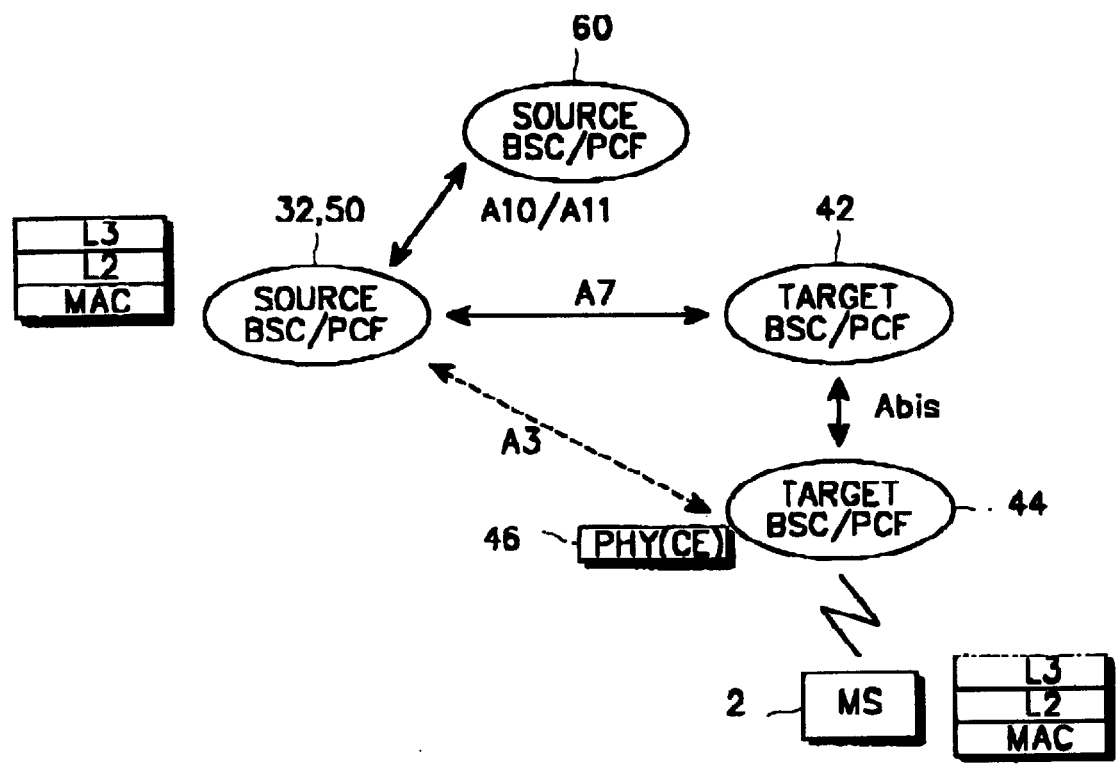
FIG. 3 illustrates function mapping for state transition between modes shown in FIG. 1.
Figure 4:
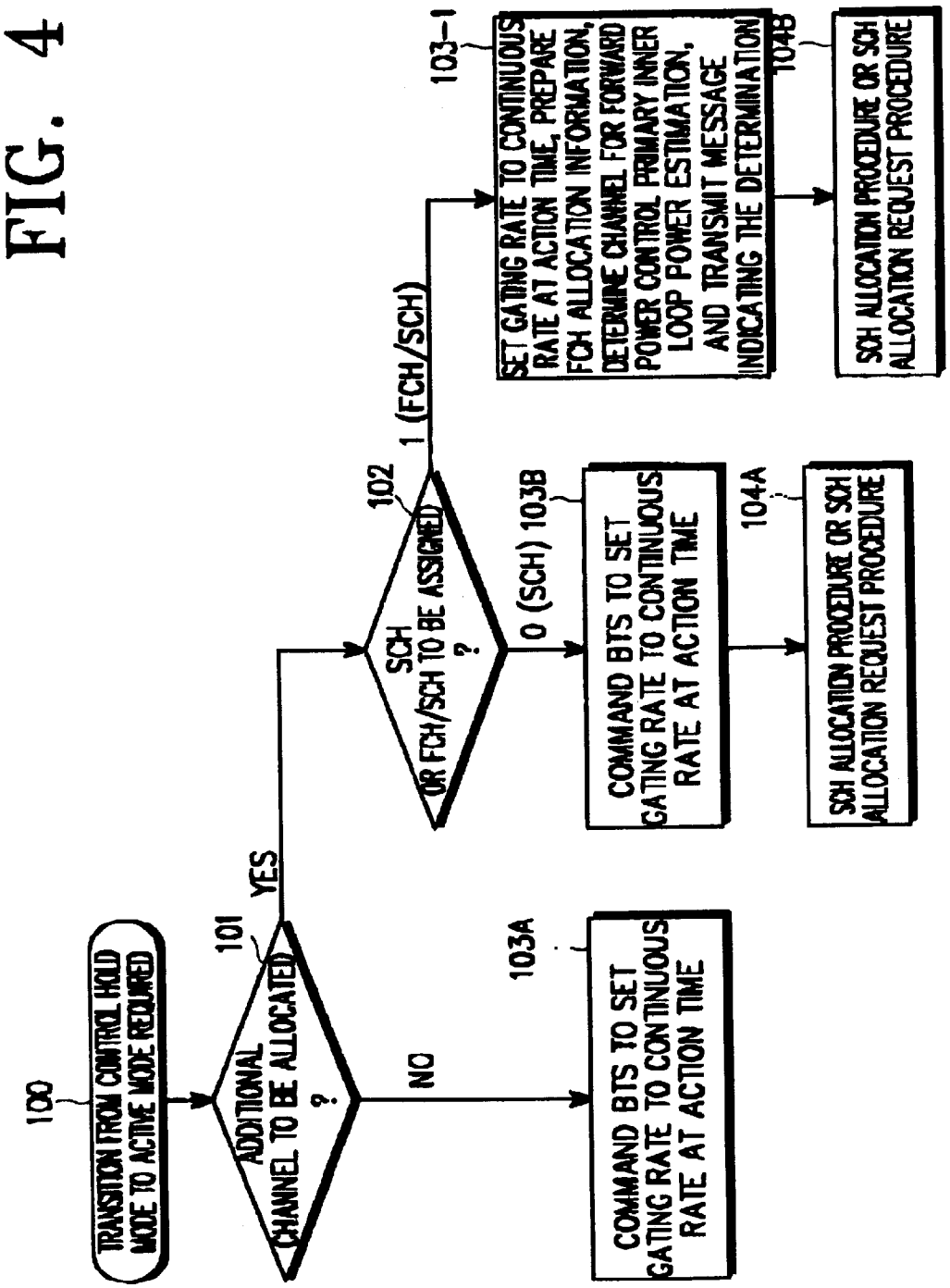
FIG. 4 is a flowchart illustrating a BTS controlling operation in a BSC when a control hold state is transited to an active mode at a traffic channel substate in a mobile communication system according to the present invention.

FIG. 4 is a flowchart illustrating a BTS controlling operation in a BSC when a control hold state is transited to an active mode at a traffic channel substate in a mobile communication system according to the present invention. Here, it is assumed that both an MS and the BSC are at the control hold mode and a DCCH has been established.

Referring to FIG. 4, the MS intends to transit from the control hold state to the active mode under some circumstances, or the BSC itself is placed in a situation to transit the control hold state to the active state due to receipt of data from a PDSN in step 100. In step 101, the BSC determines whether a new channel needs to be allocated besides the established DCCH. If the new channel is required, the procedure goes to step 102, and otherwise, it goes to step 103A.

In step 103A, the BSC commands a corresponding BTS to set a gating rate on the DCCH in current use to a continuous rate at a designated action time.

The BSC determines whether an SCH ('0') is to be set up or both an FCH and an SCH ('1') are to be set in step 102. If only the SCH is to be established, step 103B is performed in the same manner as in step 103A. Then, the BSC prepares information about the SCH, performs an SCH allocating procedure with the BTS if the MS is within the coverage area of the BTS that belongs to the BSC, and requests allocation of the SCH when the MS is within the coverage area of a BTS that belongs to a target BSC in step 104A.

If both the FCH and the SCH are to be established, the gating rate on the DCCH in current use is set to a continuous rate at a designated action time, information about the allocation of the FCH is prepared, and it is determined whether forward power control primary inner loop power estimation will be implemented on the existing DCCH or on the new FCH, in step 103-1. A message representing the determination is transmitted to the BTS if the MS is within the coverage area of the BTS belonging to the BSC and to a target BSC if the MS is within the coverage area of the target BSC. Then, step 104B is performed in the same manner as step 104A.

Figure 5:
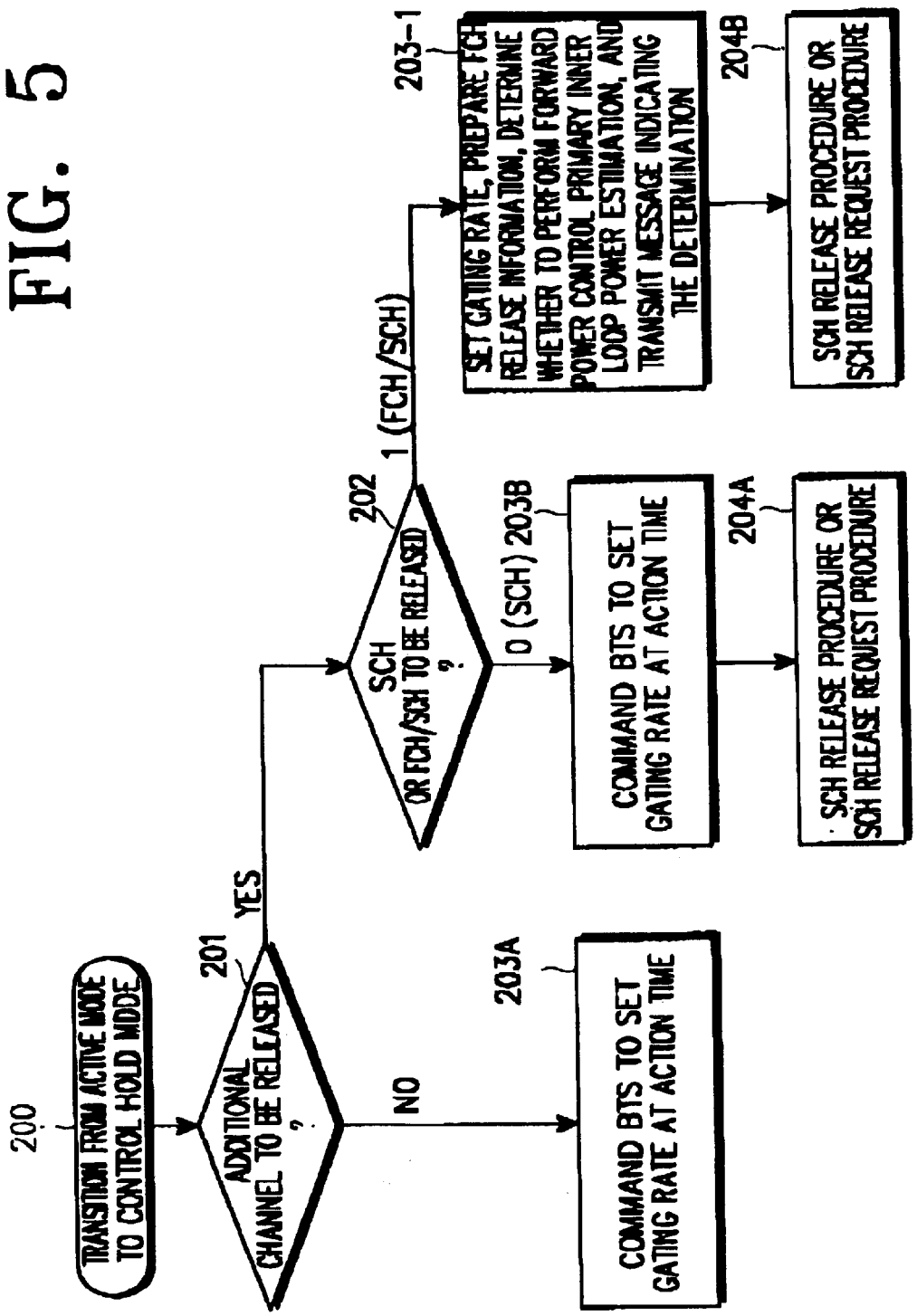
FIG. 5 his a flowchart illustrating a BTS controlling operation in the BSC when the active mode is transited to the control hold state at the traffic channel substate in the mobile communication system according to the present invention.

FIG. 5 is a flowchart illustrating a BTS controlling operation in the BSC when the active state is transited to the control hold state at the traffic channel substate in the mobile communication system according to the present invention. Here, it is assumed that both the MS and the BSC are at the active state. The control operation is performed in consideration of the cases that a DCCH and an SCH have been established and an FCH, a DCCH, and an SCH have been established.

Referring to FIG. 5, the MS intends to transit from the active state to the control hold state, or the BSC itself is placed in a situation to transit the active state to the control hold state due to completed data transmission from the PDSN in step 200. In step 201, the BSC determines whether another channel needs to be released besides the established DCCH. If another channel should be released, the procedure goes to step 202, and otherwise, it goes to step 203A.

In step 203A, the BSC commands a corresponding BTS to set a gating rate on the DCCH in current use to one of 1, ½, and ¼ at a designated action time.

The BSC determines whether the additional channels to be released are only one channel, i.e., the SCH ('0') or both the FCH and the SCH ('1') in step 202. If only the SCH is to be released, step 203B is performed in the same manner as step 203A. Then, the BSC prepares information about the SCH, performs an SCH release procedure with the BTS if the MS is within the coverage area of the BTS that belongs to the BSC, and requests allocation of the SCH when the MS is within the coverage area of a BTS that belongs to a target BSC in step 204A.

If both the FCH and the SCH are to be released, the gating rate on the DCCH in current use is set to 1, ½, or ¼ at a designated action time, information about release of the FCH is prepared, and it is determined whether forward power control primary inner loop power estimation will be implemented on the existing DCCH or not, in step 203-1. A message representing the determination is transmitted to the BTS if the MS is within the coverage area of the BTS belonging to the BSC, or to a target BSC if the MS is within the coverage area of the target BSC. Then step 204B is preformed in the same manner as step 204A.

Figure 6:
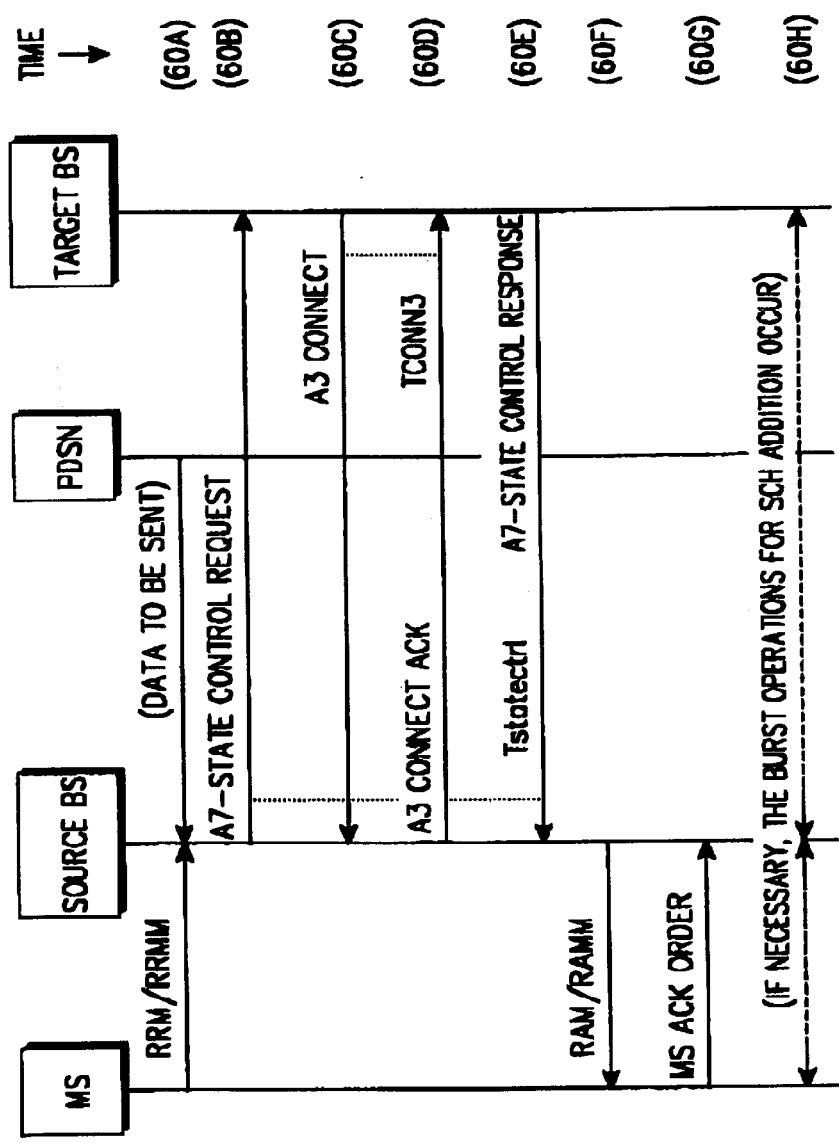
FIG. 6 illustrates a call flow between a source BS and a target BS when the control hold mode is transited to the active mode at the traffic channel substate in the mobile communication system according to the present invention.

FIG. 6 illustrates a call flow between a source BS and a target BS when the control hold state is transited to the active mode at the traffic channel substate in the mobile communication system according to the present invention. The call flow occurs between the source BS and the target BS in P2 and P3 cases when an MS roams to the target BS after soft handoff. If the MS stays at a BTS within the source BS without soft handoff, a message named "Abis-xxx" may be used instead of a message named "A7-xxx". It is to be noted that this drawing covers the case that an FCH and an SCH are to be allocated in addition to an existing DCCH and excludes an SCH set-up procedure possibly required when high rate data is generated.

Referring to FIG. 6, when the source BS and the MS are at the control hold mode, the source BS receives an indication from either the MS (via an RRM/RRMM (Resource Request Message/Resource Request Mini Message)) or the PDSN that data needs to be sent to the MS in step 60A. The source BS sends an A7-State Control Request to the target BS, which includes control information about necessary physical channels for the state transition from the control hold mode to the active mode in step 60B. The source BS starts a timer Tstatectrl. As soon as the target BS receives the A7-State Control Request message, it sets a reverse pilot gating rate to a continuous gating rate and renders the continuous rate in effect at an action time designated by the source BS. For P3 case, the target BS begins to allocate an FCH and determines whether a forward inner loop power control procedure is to be implemented on the FCH or the existing DCCH.

Steps 60C and 60D are applied to P3 case only. In step 60C, a channel element of the target BS sends an A3-Connect message to the source BS notifying that the channel element has been connected to an SDU of the source BS in order to connect the designated FCH to a frame selector for mode transition. The target BS starts a timer Tconn3. The source BS sends an A3-Connect Ack message to the channel element of the target BS, notifying that the physical channels are completely prepared for mode transition in step 60D. The target BS stops the timer Tconn3 in response to the A3-Connect Ack message.

In step 60E, after the target BS has performed the procedures necessary to control the physical channels for mode transition, it sends an A7-State Control response message to the source BS. The source BS stops the timer Tstatectrl in response to the A7-State Control Response message.

In step 60F, the source BS sends a RAM or RAMM to the MS, commanding mode transition. The MS acknowledges receipt of the RAM or RAMM by transmitting an MS Ack Order message in L2 to the source BS in step 60G. After the control hold mode is completely transited to the active mode, if it is necessary to allocate an SCH, the SCH is set up in an SCH allocation procedure as provided by the 3S IOS 2.6.4.1 standard in step 60H.

Figure 7:
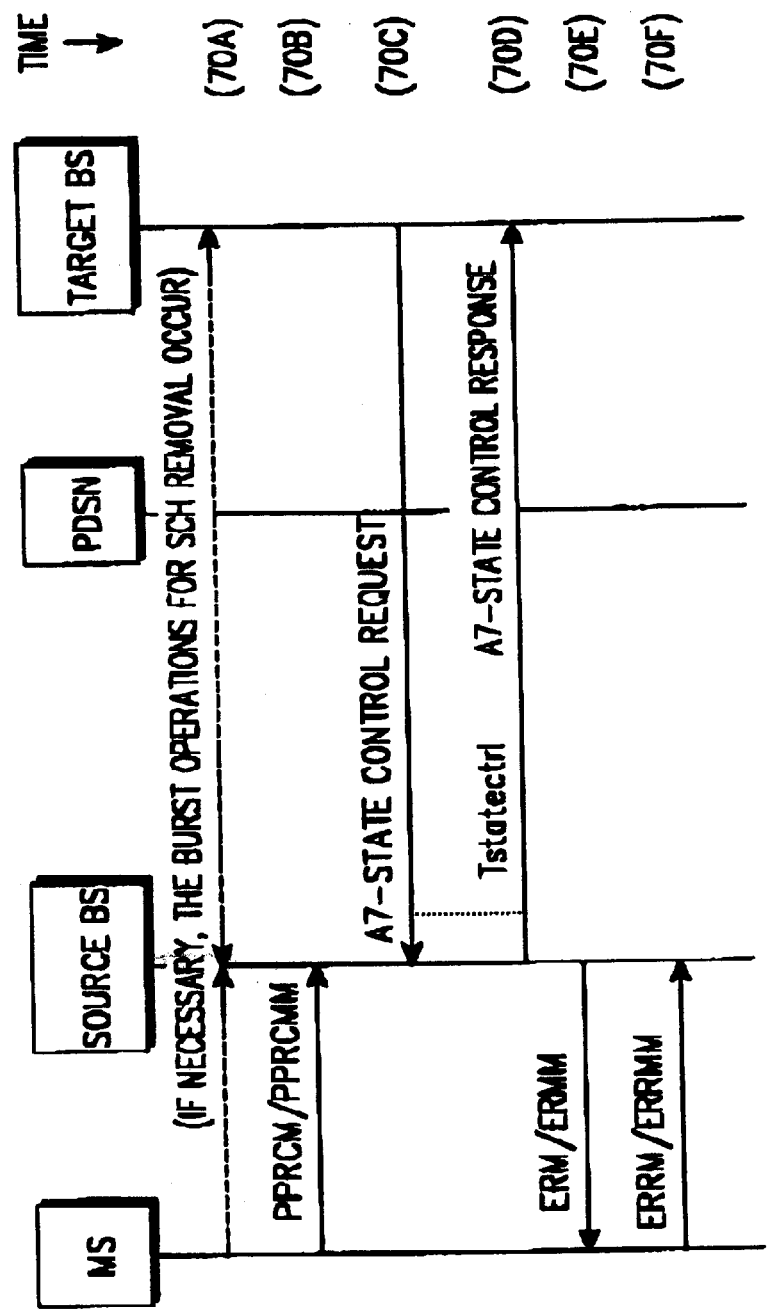
FIG. 7 illustrates a call flow between the source BS and the target BS when the active mode is transited to the control hold mode at the traffic channel substate in the mobile communication system according to the present invention.

FIG. 7 illustrates a call flow between the source BS and the target BS when the active mode is transited to the control hold mode at the traffic channel substate in the mobile communication system according to the present invention. The call flow occurs between the source BS and the target BS in P2 and P3 cases when the MS roams to the target BS after soft handoff. If the MS stays at a BTS within the source BS without soft handoff, a message named "Abis-xxx" may be used instead of a message named "A7-xxx". It is to be noted that this drawing covers the case that an FCH and an SCH are to be released in addition to an existing DCCH and excludes an SCH release procedure that can be performed before mode transition.

Referring to FIG. 7, when the source BS and the MS are at the active mode, the SCH release procedure can be performed prior to transition to the control hold state when necessary, in step 70A. In step 70B, the source BS receives an indication from the MS (via a PPRCM/PPRCMM (Peer-to-Peer Resource Control Message/Peer-to-Peer Resource Control Minim Message)) or an autonomously generated indication for transition to the control hold mode.

The source BS sends the A7-State Control Request to the target BS, which includes control information about necessary physical channels for the state transition from the active mode to the control hold mode, in step 70C. The source BS starts the timer Tstatectrl. As soon as the target BS receives the A7-State Control Request message, it sets a reverse pilot gating rate to a designated gating rate and renders the gating rate in effect at an action time designated by the source BS. For P3 case, the target BS begins to release an FCH and determines that a forward inner loop power control procedure for reverse power control is to be implemented on the DCCH only.

In step 70D, after the target BS has performed the procedures necessary to control the physical channels for mode transition, it sends an A7-State Control response message to the source BS. The source BS stops the timer Tstatectrl in response to the A7-State Control Response message.

In step 70E, the source BS sends an ERM or an ERMM to the MS, commanding mode transition. The MS acknowledges receipt of the ERM or ERMM by transmitting an ERRM (Extended Release Response Message) or an ERRMM (Extended Release Response Mini Message) to the source BS in step 70F.

Figure 8:
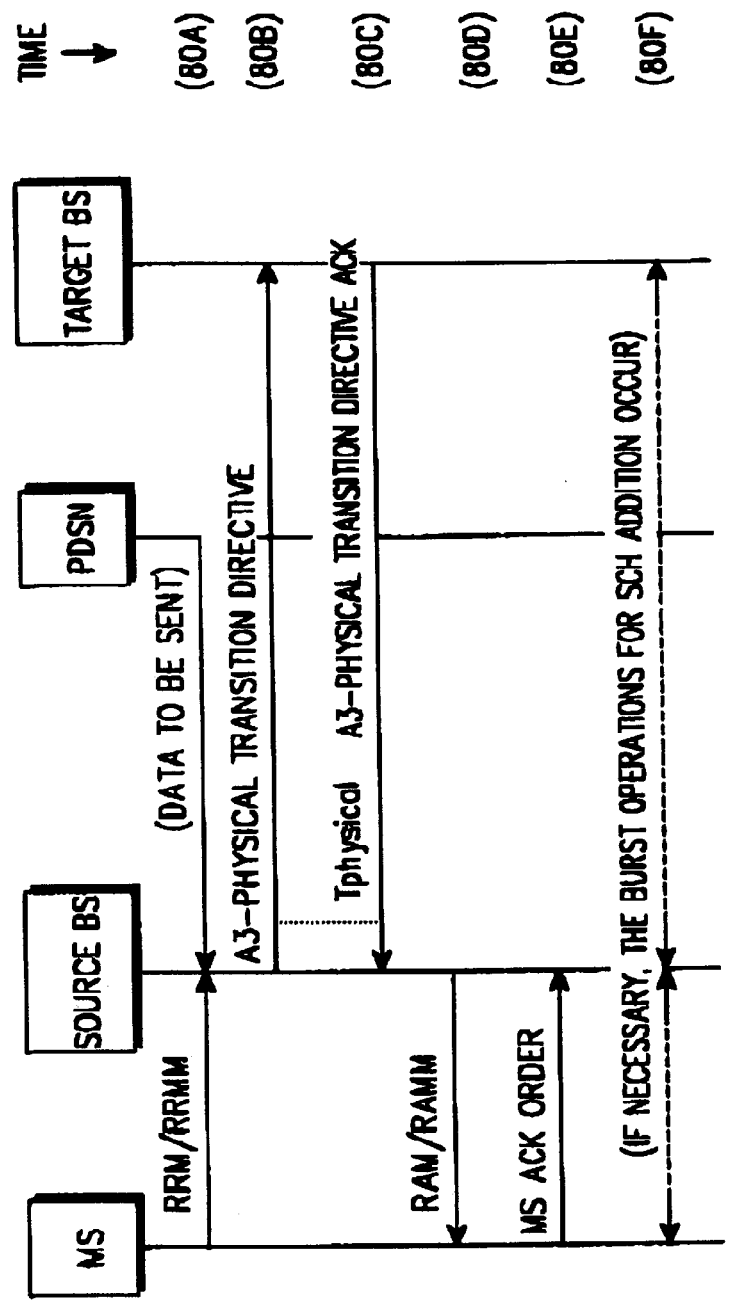
FIG. 8 illustrates another call flow between the source BS and the target BS when the control hold mode is transited to the active mode at the traffic channel substate in the mobile communication system according to the present invention.

FIG. 8 illustrates another call flow between the source BS and the target BS when the control hold state is transited to the active mode at the traffic channel substate in the mobile communication system according to the present invention. The call flow occurs between a source BS and the target BS in P2 case when the source BS receives data from an external PDSN or transmits MS-originated data with the MS within the coverage area of the target BS after soft handoff. If the MS stays at a BTS within the source BS without soft handoff, a message named "Abis-xxx" may be used instead of a message named "A3-xxx". It is to be noted that this drawing covers the case that only an SCH is to be allocated in addition to an existing DCCH and excludes an SCH set-up procedure for transmission of high speed data.

Referring to FIG. 8, when the source BS and the MS are at the control hold mode, the source BS receives an indication for transition to the active state from either the MS (via an RRM/RRMM) or the network (via data being received from the PDSN) that data needs to be sent to the MS in step 80A. The source BS sends an A3-Physical Transition Directive message to a target BS, which includes control information about necessary physical channels for the state transition from the control hold mode to the active mode in step 80B. The source BS starts a timer Tphysical. As soon as the target BS receives the A3-Physical Transition Directive message, it sets a reverse pilot gating rate to a continuous gating rate and renders the continuous rate in effect at an action time designated by the source BS.

In step 80C, after the target BS has performed the procedures necessary to control the physical channels for mode transition, it sends an A3-Physical Transition Directive Ack message to the source BS, notifying the results of the procedures. The source BS stops the timer Tphysical in response to the A3-Physical Transition Directive Ack message.

In step 80D, the source BS sends a RAM or RAMM to the MS, commanding mode transition. The MS acknowledges receipt of the RAM or RAMM by transmitting the MS Ack Order message in L2 to the source BS in step 80E. After the control hold mode is completely transited to the active mode, if it is necessary to allocate an SCH, the SCH is set up in an SCH allocation procedure as provided by the 3S IOS 2.6.4.1 standard in step 80F.

Figure 9:
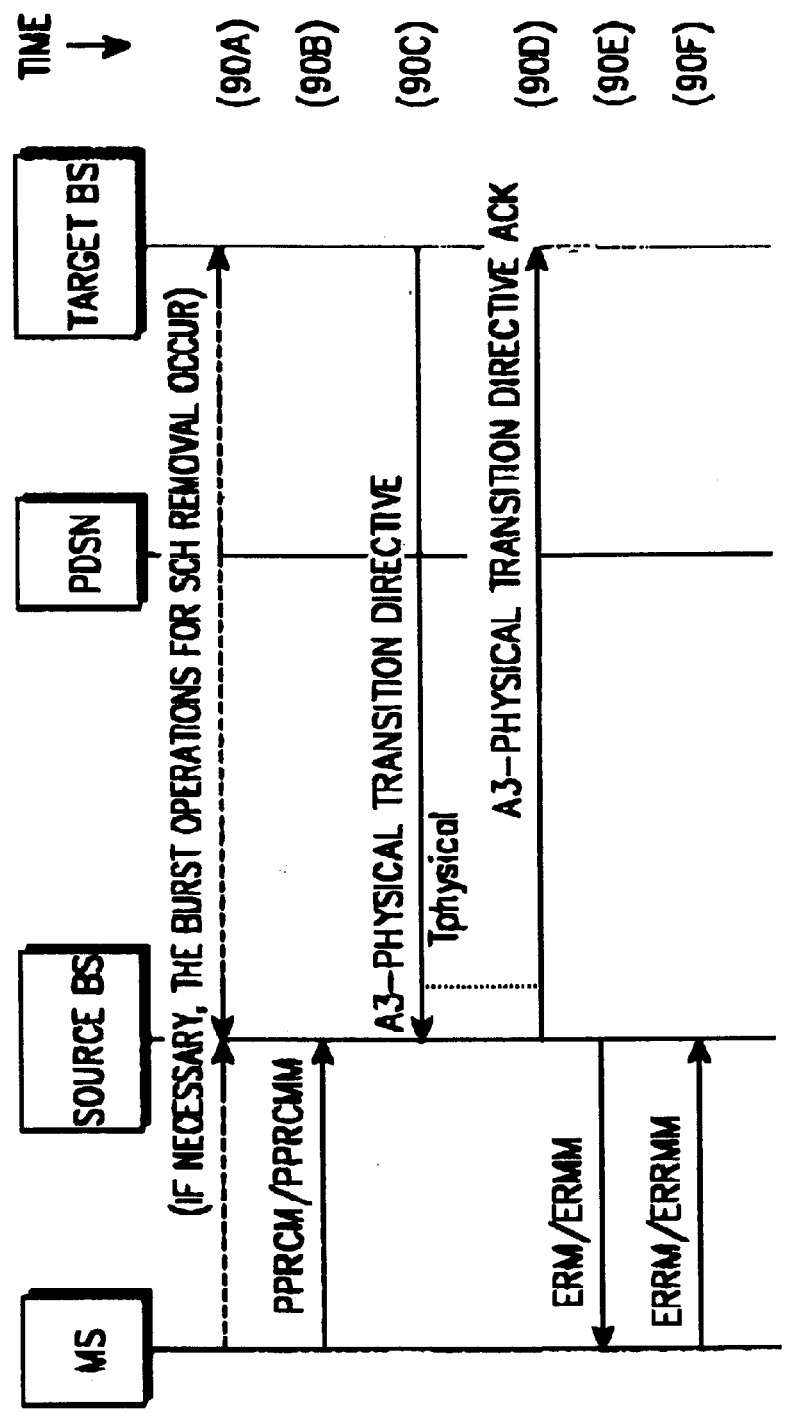
FIG. 9 illustrates another call flow between the source BS and the target BS when the active mode is transited to the control hold mode at the traffic channel substate in the mobile communication system according to the present invention.

FIG. 9 illustrates another call flow between the source BS and the target BS when the active mode is transited to the control hold mode at the traffic channel substate in the mobile communication system according to the present invention. The call flow occurs between the source BS and the target BS in P2 case when the MS roams to the target BS after soft handoff. If the MS stays at a BTS within the source BS without soft handoff, a message named "Abis-xxx" may be used instead of a message named "A3-xxx". It is to be noted that this drawing covers the case that only an SCH is to be released in addition to an existing DCCH and excludes an SCH release procedure that can be performed before mode transition.

Referring to FIG. 9, when the source BS and the MS are at the active mode, the SCH release procedure can be performed prior to transition to the control hold state when necessary, in step 90A. In step 90B, the source BS receives an indication from the MS (via a PPRCM) or an autonomously generated indication, for transition to the control hold mode.

The source BS sends the A3-Physical Transition Directive message to the target BS, which includes control information about necessary physical channels for the state transition from the active mode to the control hold mode, in step 90C. The source BS starts the timer Tphysical. As soon as the target BS receives the A3-Physical Transition Directive message, it sets a reverse pilot gating rate to a designated gating rate and renders the gating rate in effect at an action time designated by the source BS.

In step 90D, after the target BS has performed the procedures necessary to control the physical channels for mode transition, it sends an A3-Physical Transition Directive Ack message to the source BS. The source BS stops the timer. Tphysical in response to the A3-Physical Transition Directive message.

In step 90E, the source BS sends an ERM or an ERMM to the MS, commanding mode transition. The MS acknowledges receipt of the ERM or ERMM by transmitting an ERRM or an ERRMM to the source BS in step 90F.

FIG. 10 illustrates the format of the A7-State Control Request message for control of mode transition according to the present invention. This message is sent from the source BS to the target BS.

Referring to FIG. 10, the A7-State Control Request message includes the information elements: Message Type II, Call Connection Reference, Correlation ID, A3 Signaling Address, SDU-ID, Mobile Identity (IMSI/MIN), Mobile Identity (ESN), Extended Service Configuration Record, Physical Resource Control Information, Frame Selector Info, and Control Action Time. M, O, C and R indicate mandatory information elements, optionally required information elements, conditionally required information elements, and required information elements, respectively.

The information elements have the functions described below:

Message Type II: an identifier indicating an A3/A7 message;

Call Connection Reference: a unique identifier used across the whole system with respect to call connection;

A3 Signaling Address: a network node in which an SDU instance in use for a call is located;

Correlation ID: this correlates a request message to a response message;

SDU-ID: a particular SDU instance identifier within an SDU node;

Mobile Identity (IMSI/MIN): a mobile station identifier (IMSI/MIN);

Mobile Identity (ESN): a mobile station identifier (ESN); and

Extended Service Configuration Record: an information element that represents CDMA 2000-based service configuration. A radio message is capsuled as shown in Table 1.

TABLE 1

| 7 | 6 | 5 | 4 | 3 | 2 | 1 | 0 | octet |
|---|---|---|---|---|---|---|---|---|
| A7 Element Identifier | | | | | | | | 1 |
| Length | | | | | | | | 2 |
| Extended Service Configuration Record (CDMA 2000 Service Configuration Record) | | | | | | | | variable |

Referring to FIG. 10 again:

Frame Selector Info: a set of frame selectors used for a call association. This information element is used to add a new frame selector or amend the property of an existing frame selector in the call association; and Physical Resource Control Information: information necessary for control of physical channels that are allocated and released at mode transition.

Based on the information element, a target BS determines a reverse pilot gating rate and indicates allocation and release of an FCH and a DCCH and either of the channels on which a forward power control is performed for reverse power control. The Physical Resource Control Information field is shown below in Table 2.

TABLE 2

| 7 | 6 | 5 | 4 | 3 | 2 | 1 | 0 | octet |
|---|---|---|---|---|---|---|---|---|
| A3/A7 Element Identifier | | | | | | | | 1 |
| Length | | | | | | | | 2 |
| Reserved | AoR | FPC_PRI_CHAN | | CH_IND | | PILOT_GATING_RATE | | 3 |

In Table 2, "Length" is the length of the message represented by the fields following this field. Reserved is set to 00. AoR is an allocation/release indicator. The AoR field is set to 0 if this message is used to allocate physical resources and to 1 if it is used to release the physical resources. FPC_PRI_CHAN is a forward power control primary inner loop channel indicator. The source BS sets this field to 0 if the MS is to perform a power control on a received forward FCH and to 1 if the MS is to perform the power control on a received forward DCCH. CH_IND is a channel indicator set to values as listed in Table 3.

TABLE 3

| Channel Indicator Field (Binary) | Meaning |
|---|---|
| 00 | Reserved |
| 01 | FCH |
| 10 | DCCH |
| 11 | FCH and DCCH |

PILOT_GATING_RATE is an actual reverse pilot gating rate. The source BS can set this field as shown in Table 4.

TABLE 4

| PILOT_GATING_RATE Field (Binary) | Meaning |
|---|---|
| 00 | Gating Rate 1 |
| 01 | Gating Rate ½ |
| 10 | Gating rate ¼ |
| 11 | Reserved |

Returning to FIG. 10, Control Action Time: the start time for control on physical channels for mode transition. This information element is applied to the time point when a reverse pilot gating rate takes effect and is defined in Table 5.

TABLE 5

| 7 | 6 | 5 | 4 | 3 | 2 | 1 | 0 | octet |
|---|---|---|---|---|---|---|---|---|
| A3/A7 Element Identifier | | | | | | | | 1 |
| Length | | | | | | | | 2 |
| Reserved | | | Action Time | | | | | 3 |

"Length" indicates the length of a message represented by the fields following this field. Reserved is set to 00. Action time is a CDMA system time set in 80 ms units by a BSC, indicating the actual action time of gated transmission.

FIG. 11 illustrates the format of the A7-state Control Response message for use in controlling mode transition according to the present invention. This message is a response to the A7-State Control Request message received from the source BS.

Referring to FIG. 11, the A7-State Control Response message is comprised of the information elements: Message Type II, Call Connection Reference, Correlation ID, Physical Resource Control Results, Control Action Time, and Allocated Channel Information. M, O, C and R indicate mandatory information elements, optionally required information elements, conditionally required information elements, and required information elements, respectively.

The information elements have the functions described below:

Message Type II: an identifier indicating an A3/A7 message;

Call Connection Reference: a unique identifier used across the whole system with respect to call connection;

Correlation ID: this correlates a request message to a response message; and

Physical Resource Control Results: the results of controlling allocation/release of physical channels for state transition. Through this information element, the target BS provides a set reverse pilot gating rate that it supports and sets and indicates allocation/release of an FCH or a DCCH, and either of the FCH and the DCCH on which a forward power control is to be performed for reverse power control. The Physical Resource Control Results field is shown below in Table 6.

TABLE 6

| 7 | 6 | 5 | 4 | 3 | 2 | 1 | 0 | octet |
|---|---|---|---|---|---|---|---|---|
| | | | A3/A7 Element Identifier | | | | | 1 |
| | | | Length | | | | | 2 |
| Reserved | | AoR | FPC_PRI_CHAN | CH_IND | | PILOT_GATING_RATE | | 3 |

In Table 6, "Length" is the length of the message represented by the fields following this field. Reserved is set to 00. AoR is an allocation/release indicator. The AoR field is set to 0 if the target BS prepares for allocation of physical sources and to 1 if it prepares for release of the physical sources. FPC_PRI_CHAN is a forward power control primary inner loop channel indicator indicating the actual operation status of the target BS. The target BS sets this field to 0 if the MS is to perform a power control on a forward FCH on which the MS has received a primary inner loop power estimation and to 1 if the MS is to perform the power control on a received forward DCCH on which the MS has received the primary inner loop power estimation. CH_IND is a channel indicator set to values as listed in Table 7.

TABLE 7

| Channel Indicator Field (Binary) | Meaning |
|---|---|
| 00 | Reserved |
| 01 | FCH |
| 10 | DCCH |
| 11 | FCH and DCCH |

PILOT_GATING_RATE in Table 6 is an actual reverse pilot gating rate. The target BS sets this field as shown in Table 8.

TABLE 8

| PILOT_GATING_RATE Field (Binary) | Meaning |
|---|---|
| 00 | Gating Rate 1 |
| 01 | Gating Rate ½ |

TABLE 8-continued

| PILOT_GATING_RATE Field (Binary) | Meaning |
|---|---|
| 10 | Gating rate ¼ |
| 11 | Reserved |

Returning to FIG. 11, Allocated Channel Information: information about a new physical channel allocated when a MAC state transits from a control hold mode (P2 and P3 cases) or a suspended mode (P1, P2, and P3 cases) to an active mode. The Allocated Channel Information has the following information fields shown in Table 9.

TABLE 9

| 7 | 6 | 5 | 4 | 3 | 2 | 1 | 0 | octet |
|---|---|---|---|---|---|---|---|---|
| | | | | A3/A7 Element Identifier | | | | 1 |
| | | | | Length | | | | 2 |
| | Reserved | | | DCCH_Included | New Cell Indicator | PWR_Comb_Inc | (MSB) | 3 |
| | | | | Pilot_PN | | | (LSB) | 4 |
| | | | | Cell Identification Discriminator | | | | 5 |
| | | | | Cell Identification | | | | 6 |
| | | Reserved | | | FCH/DCCH_IND | QoF_Mask | | 7 |
| | | | | Frame_Selector_Index | | | | 8 |
| | | | | Code_Chan | | | | 9 |
| | | Reserved | | | FCH/DCCH_IND | QoF_Mask | | 10 |
| | | | | Frame_Selector_index | | | | 11 |
| | | | | Code_Chan | | | | 12 |

Referring to Table 9, "Length" indicates the length of a message represented by the fields following this field. Reserved is set to 0000. DCCH_Included is set to 1 if this information element includes DCCH information, which implies that the suspended state is transited to the active state and to 0 if it does not include the DCCH information. New Cell Indicator is used to support a procedure for the case that mode transition is related with a channel element. The New Cell Indicator field is set to 1 for A3 traffic connection to a new cell and to 0 for A3 traffic connection to an existing cell. PWR_Comb_Ind is a power control symbol combining indicator. The BTS sets this field to 1 if the closed loop power control subchannel of the previous pilot is still used on a forward traffic channel related with a corresponding pilot. This field is set to 0 when it is initially written. Pilot_PN is the pilot PN sequence offset of an old cell or a new cell where the MS is located. Cell Identification Discriminator is used together with Cell Identifier Element that provides the format of Cell Identification. Cell Identification identifies a new cell to which the MS roamed when the suspended mode (P1, P2, and P3 cases) is transited to the active mode and an old cell when the control hold mode (P2 and P3 cases) is transited to the active mode. This field has the same format as provided by the existing 3G IOS standard. Reserved is set to 00000. FCH/DCCH_IND is set to 0 if the following fields QoF_Mask, Frame Selector Index, and Code_Chan are information for an FCH and to 1 if they are information for a DCCH. QoF_Mask is a quasi-orthogonal function mask index, i.e., the mask index of a quasi-orthogonal code used for a corresponding physical channel. This field is set to be compatible with CDMA 2000 field definition. Frame Selector Index is the index of a frame selector newly connected to the corresponding physical channel at mode transition. Code_Chan is a Walsh code for the physical channel provided by a related cell, ranging from 0 to 255.

Returning to FIG. 11, Control Action Time: the start time for control on physical channels for mode transition in the target BS. This information element is applied to the time point when a reverse pilot gating rate takes effect and is shown in Table 10.

TABLE 10

| 7 | 6 | 5 | 4 | 3 | 2 | 1 | 0 | octet |
|---|---|---|---|---|---|---|---|---|
| A3/A7 Element Identifier | | | | | | | | 1 |
| Length | | | | | | | | 2 |
| Reserved | | | Action Time | | | | | 3 |

"Length" indicates the length of a message represented by the fields following this field. Reserved is set to 00. Action time is a CDMA system time set in 80 ms units by a BSC, indicating the actual action time of gated transmission.

FIG. 12 is a table that lists values of the timer Tstatectrl used for mode transition described in FIGS. 6 and 7. This timer is activated after the source BS sends the A7-State Control Request message to the target BS and stopped when the source BS receives the A7-State Control Response message from the target BS.

FIG. 13 illustrates the format of the A3-Physical Transition Directive message for control of mode transition according to the present invention. This message is directed from the source BS to the target BS.

Referring to FIG. 13, the A3-Physical Transition Directive message includes the information elements: Message Type II, Call Connection Reference, CDMA Long Code Transition Info, Channel Element ID, A3 Traffic Circuit ID, Reverse Pilot Gating Rate, IS-2000 Forward Power Control Mode, IS-2000 Mobile Pilot Gain, A3 From ID, and A3 to ID. The A3-Physical Transition Directive message is defined according to the IOS V4.0 standard. The following description is confined to Reverse Pilot Gating Rate that is related to mode transition according to the present invention among the above information elements. Reverse Pilot Gating Rate is constituted as shown in Table 11.

TABLE 11

| 7 | 6 | 5 | 4 | 3 | 2 | 1 | 0 | octet |
|---|---|---|---|---|---|---|---|---|
| A3/A7 Element Identifier | | | | | | | | 1 |
| Length | | | | | | | | 2 |
| Reserved | | | | | | PILOT_GATIN G_RATE | | 3 |
| Action Time | | | | | | | | 4 |

In Table 11, PILOT_GATING_RATE is an actual reverse pilot gating rate set by the target BS. The source BS can set this field as shown in Table 12. Action Time is the start time for control on physical channels for mode transition. This is applied to the time point when a reverse pilot gating rate takes effect. In addition, Action Time is a CDMA system time set in 80 ms units by the BSC, indicating an actual action time of gated transmission.

TABLE 12

| PILOT_GATING_RATE Field (Binary) | Meaning |
|---|---|
| 00 | Gating Rate 1 |
| 01 | Gating Rate ½ |
| 10 | Gating rate ¼ |
| 11 | Reserved |

FIG. 14 illustrates the format of the A3-Physical Transition Directive Ack message transmitted from the target BS to the source BS in response to the A3-Physical Transition Directive message received from the source BS for control of mode transition according to the present invention. This message is the same as a conventional A3-Physical Transition Directive Ack message. No information elements of the message provide information related with mode transition. That is, the A3-Physical Transition Directive Ack message is a mere response to the A3-Physical Transition Directive message.

As described above, the present invention defines signal messages and related procedures that are necessary for control of mode transition in a traffic channel substate between a source BS and a target BS in a mobile communication system, to thereby control the transition between the control mode and the active mode for P2 and P3 cases, the transition between the suspended mode and the active mode for P1 cases, along with the corresponding physical channels. Therefore, call drop can be prevented during mode transition.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station transceiver (BTS) controlling method in a base station controller (BSC) for mode transition in a mobile communication system, comprising the steps of:

setting a transmission rate on a dedicated control channel (DCCH) in use to a continuous rate and transmitting the continuous rate information to a BTS that a mobile station (MS) is within the coverage area of the BTS, if a control hold mode should be transited to an active mode; and allocating an additional required channel besides the DCCH.

2. The BTS controlling method of claim 1, wherein the additional channel allocation step comprises the steps of:

preparing supplemental channel (SCH) allocation information if the additional channel is an SCH;

allocating the SCH with the BTS if the MS is within the coverage area of the BTS; and requesting allocation of the SCH to a different BSC if the MS is within the coverage area of a BTS within the service area of the different BSC.

3. The BTS controlling method of claim 1, wherein the additional channel allocation step comprises the steps of:

preparing fundamental channel (FCH) allocation information if an FCH and an SCH are to be allocated, and determining a power control channel among the DCCH, the FCH, and the SCH;

transmitting a message including the determination to the BTS, preparing SCH allocation information, and allocating the SCH with the BTS, if the MS is within the coverage area of the BTS; and transmitting the message including the determination to a different BSC, preparing SCH allocation information, and requesting allocation of the SCH to the different BSC, if the MS belongs to a BTS within the service area of the different BSC.

4. A base station transceiver (BTS) controlling method in a base station controller (BSC) for mode transition in a mobile communication system, comprising the steps of:

setting a transmission rate on a dedicated control channel (DCCH) in use to a predetermined gating rate and transmitting the gating rate information to a BTS that a mobile station (MS) is within the coverage area of the BTS, if an active mode should be transited to a control held mode; and releasing an additional required channel besides the DCCH.

5. The BTS controlling method of claim 4, wherein the additional channel releasing step comprises the steps of:

preparing supplemental channel (SCH) release information if the additional channel is an SCH;

releasing the SCH with the BTS if the MS is within the coverage area of the BTS; and requesting release of the SCH to a different BSC if the MS is within the coverage area of a BTS within the service area of the different BSC.

6. The BTS controlling method of claim 4, wherein the additional channel allocation step comprises the steps of:

preparing fundamental channel (FCH) release information if an FCH and an SCH are to be released, and determining whether a power control is to be performed on the DCCH;

transmitting a message including the determination to the BTS, preparing SCH release information, and releasing the SCH with the BTS, if the MS is within the coverage area of the BTS; and transmitting the message including the determination to a different BSC, preparing SCH release information, and requesting release of the SCH to the different BSC, if the MS is within the coverage area of a BTS within the service area of the different BSC.

7. A method of controlling a call between a source base station (BS) and a target BS for mode transition after soft handoff of a mobile station (MS) in a mobile communication system, comprising the steps of:

transmitting a first message including control information about a physical channel necessary for mode transition to the target BS by the source BS, if a control hold mode transition to an active mode is required;

setting the transmission rate of a pilot on a reverse dedicated control channel (DCCH) to a continuous rate in response to the first message, preparing for allocation of a fundamental channel (FCH), determining a reverse power control channel between the DCCH and the FCH, and transmitting a second message from the target BS to the source BS, indicating that connection is made to the source BS;

preparing the physical channel for mode transition in response to the second message and transmitting from the source BS a third message indicating that the physical channel is ready;

performing a procedure necessary for controlling the physical channel in response to the third message and transmitting from the target BS a fourth message indicating the result of the procedure to the source BS; and commanding the MS to transit to the active mode in response to the fourth message by the source BS and transiting the source BS and the MS from the control hold mode to the active mode.

8. The method of claim 7, further comprising the step of allocating a supplemental channel (SCH) after the mode transition step.

9. A method of controlling a call between a source base station (BS) and a target BS for mode transition after soft handoff of a mobile station (MS) in a mobile communication system, comprising the steps of:

transmitting a first message including control information about a physical channel necessary for mode transition from the source BS to the target BS, if an active mode transition to a control hold mode is required;

setting the transmission rate of a pilot on a reverse dedicated control channel (DCCH) to a predetermined gating rate in response to the first message, preparing for release of a fundamental channel (FCH), determining a reverse power control on the DCCH, performing a procedure necessary for controlling the physical channel, and transmitting a second message indicating the result of the procedure from the target BS to the source BS; and commanding the MS to transit to the control hold mode in response to the second message by the source BS and transiting the source BS and the MS from the active mode to the control hold mode.

10. The method of claim 9, further comprising the step of releasing a supplemental channel (SCH) before the mode transition step.

11. A method of controlling a call between a source base station (BS) and a target BS for mode transition after soft handoff of a mobile station (MS) in a mobile communication system, comprising the steps of:

transmitting a first message including control information about a physical channel necessary for mode transition to the target BS from the source BS, if a control hold mode transition to an active mode is required;

setting the transmission rate of a pilot on a reverse dedicated control channel (DCCH) to a continuous rate in response to the first message, performing a procedure necessary for controlling the physical channel, and transmitting a second message indicating the result of the procedure from the target BS to the source BS; and commanding the MS to transit to the active mode in response to the second message by the source BS and transiting the source BS and the MS from the control hold mode to the active mode.

12. The method of claim 11, further comprising the step of allocating a supplemental channel (SCH) after the mode transition step.

13. A method of controlling a call between a source base station (BS) and a target BS for mode transition after soft handoff of a mobile station (MS) in a mobile communication system, comprising the steps of:

transmitting a first message including control information about a physical channel necessary for mode transition from the source BS to the target BS, if an active mode transition to a control hold mode is required;

setting the transmission rate of a pilot on a reverse dedicated control channel (DCCH) to a predetermined gating rate in response to the first message, performing a procedure necessary for controlling the physical channel, and transmitting a second message indicating the result of the procedure from the target BS to the source BS; and commanding the MS to transit to the control hold mode in response to the second message from the source BS and transiting the source BS and the MS from the active mode to the control hold mode.

14. The method of claim 13, further comprising the step of releasing a supplemental channel (SCH) before the mode transition step.

* * * * *

UNITED STATES PATENT AND TRADEMARK OFFICE
CERTIFICATE OF CORRECTION

PATENT NO. : 6,834,190 B1
DATED : December 21, 2004
INVENTOR(S) : Hyun-Seok Lee et al.

It is certified that error appears in the above-identified patent and that said Letters Patent is hereby corrected as shown below:

Title page,
Item [54], Title, "CONTROLLING METHOD AND APPARATUS FOR TRANSITION BETWEEN MODES AT TRAFFIC CHANNEL SUBSTRATE IN MOBILE COMMUNICATION SYSTEM" should be -- CONTROLLING METHOD AND APPARATUS FOR TRANSITION BETWEEN MODES AT TRAFFIC CHANNEL SUBSTATE IN MOBILE COMMUNICATION SYSTEM --.

Signed and Sealed this

Tenth Day of May, 2005

JON W. DUDAS
*Director of the United States Patent and Trademark Office*